United States Patent
Katz et al.

(10) Patent No.: US 11,803,793 B2
(45) Date of Patent: Oct. 31, 2023

(54) AUTOMATED DATA FORECASTING USING MACHINE LEARNING

(71) Applicant: Citizens Financial Group, Inc., Providence, RI (US)

(72) Inventors: Noam Katz, Lincoln, RI (US); Rakesh Sahay, Wilton, CT (US); Sreejith Sreekumar, Brighton, MA (US); Saumitra Pande, Cambridge, MA (US); Frederic Chanfrau, Providence, RI (US); Vijay Jegadeesan, Farmington, CT (US); Vinay Jha, New Canaan, CT (US)

(73) Assignee: Citizens Financial Group, Inc., Providence, RI (US)

( * ) Notice: Subject to any disclaimer, the term of this patent is extended or adjusted under 35 U.S.C. 154(b) by 133 days.

(21) Appl. No.: 17/519,056

(22) Filed: Nov. 4, 2021

(65) Prior Publication Data
US 2022/0147895 A1 May 12, 2022

Related U.S. Application Data

(60) Provisional application No. 63/110,801, filed on Nov. 6, 2020.

(51) Int. Cl.
*G06Q 40/12* (2023.01)
*G06Q 10/0631* (2023.01)
(Continued)

(52) U.S. Cl.
CPC ....... *G06Q 10/06315* (2013.01); *G06F 16/26* (2019.01); *G06F 18/214* (2023.01);
(Continued)

(58) Field of Classification Search
None
See application file for complete search history.

(56) References Cited

U.S. PATENT DOCUMENTS

| 2011/0093324 A1* | 4/2011 | Fordyce, III | G06Q 30/0201 705/14.27 |
| 2019/0122307 A1* | 4/2019 | Sayed | G06Q 20/389 |

(Continued)

FOREIGN PATENT DOCUMENTS

WO  WO-2021257610 A1 * 12/2021

*Primary Examiner* — Paul S Schwarzenberg
(74) *Attorney, Agent, or Firm* — Duane Morris LLP

(57) ABSTRACT

A system and method are disclosed herein. The system includes one or more processors and a memory having programming instructions stored thereon, which, when executed by the one or more processors, performs operations. The operations include retrieving historical account activity. The operations further include constructing a training data set that includes the historical inflow data, the historical outflow data, and known forecast information from the historical account activity. The operations further include generating a combined prediction model configured to forecast future inflow activity and future outflow activity. The operations further include receiving current inflow activity, current outflow activity, and current balance information for a user. The operations further include generating a predicted account balance by forecasting, by the prediction model, a future inflow and a future outflow and constructing the predicted account balance based on the future inflow, the future outflow, and the current balance information.

18 Claims, 6 Drawing Sheets

(51) Int. Cl.
    *G06N 20/00*          (2019.01)
    *G06F 16/26*          (2019.01)
    *G06Q 30/0204*      (2023.01)
    *G06F 18/214*       (2023.01)

(52) U.S. Cl.
    CPC ......... *G06N 20/00* (2019.01); *G06Q 30/0205* (2013.01); *G06Q 40/12* (2013.12)

(56) References Cited

U.S. PATENT DOCUMENTS

| | | | |
|---|---|---|---|
| 2020/0242483 A1* | 7/2020 | Shashikant Rao | G06N 5/01 |
| 2020/0279198 A1* | 9/2020 | Turner | G06Q 40/06 |
| 2020/0410410 A1* | 12/2020 | Tripathi | G06Q 10/04 |
| 2021/0089944 A1* | 3/2021 | Zhou | G06Q 10/04 |
| 2022/0398604 A1* | 12/2022 | Abdul | G06Q 30/0201 |
| 2023/0005055 A1* | 1/2023 | Chen | G06F 18/2148 |

* cited by examiner

AUTOMATED DATA FORECASTING USING MACHINE LEARNING

FIELD OF THE DISCLOSURE

The present disclosure generally relates to a system and method for generating automated data forecasts using machine learning.

BACKGROUND

Accurately capturing a snapshot of a user's account activity is a critical component to both an individual's forecasted outlook as well as a business or organization's forecasted outlook. While there are several solutions for users to gain insight to their financial projections, such solutions suffer from a variety deficiencies due to their inability to account for incremental errors that, over time, lead to erroneous projections.

SUMMARY

In some embodiments, a system is disclosed herein. The system includes one or more processors and a memory. The memory has programming instructions stored thereon, which, when executed by the one or more processors, performs operations. The operations include retrieving historical account activity for a plurality of users. The historical account activity includes historical inflow data and historical outflow data. The operations further include constructing a training data set that includes the historical inflow data, the historical outflow data, and known forecast information from the historical account activity. The operations further include generating a combined prediction model configured to forecast future inflow activity and future outflow activity. The generating includes learning, by the prediction model, to forecast the future inflow activity and the future outflow activity based on the training data set, the learning comprising optimizing an objective function of the combined prediction model by penalizing errors for projected inflow predictions, projected outflow predictions, and differences between the projected inflow predictions and projected outflow predictions to reduce a drift in forecasted values. The operations further include receiving, from one or more third-party systems, current inflow activity, current outflow activity, and current balance information for a user. The operations further include generating a predicted account balance by forecasting, by the prediction model, a future inflow and a future outflow and constructing the predicted account balance based on the future inflow, the future outflow, and the current balance information.

In some embodiments, a method is disclosed herein. Historical account activity for a plurality of users is retrieved. The historical account activity includes historical inflow data and historical outflow data. A training data set that includes the historical inflow data, the historical outflow data, and known forecast information from the historical account activity is constructed. A combined prediction model configured to forecast future inflow activity and future outflow activity is generated. The generating includes learning, by the prediction model, to forecast the future inflow activity and the future outflow activity based on the training data set, the learning comprising optimizing an objective function of the combined prediction model by penalizing errors for projected inflow predictions, projected outflow predictions, and differences between the projected inflow predictions and projected outflow predictions to reduce a drift in forecasted values.

In some embodiments, a non-transitory computer readable medium is disclosed herein. The non-transitory computer readable medium includes one or more sequences of instructions, which, when executed by one or more processors, causes a computing system to perform operations. The operations include receiving, by a computing system, current inflow activity, current outflow activity, and current balance information for a user. The operations further include generating, by the computing system, future forecasts for the user using a combined prediction model trained to forecast future inflow activity and forecast future outflow activity by forecasting, by the combined prediction model, a future inflow and a future outflow based on the current inflow activity, current outflow activity, and the current balance information for the user. The operations further include constructing, by the computing system, future balance data based on the future inflow and the future outflow. The operations further include presenting, by the computing system, the future inflow, the future outflow, and the future balance data to the user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
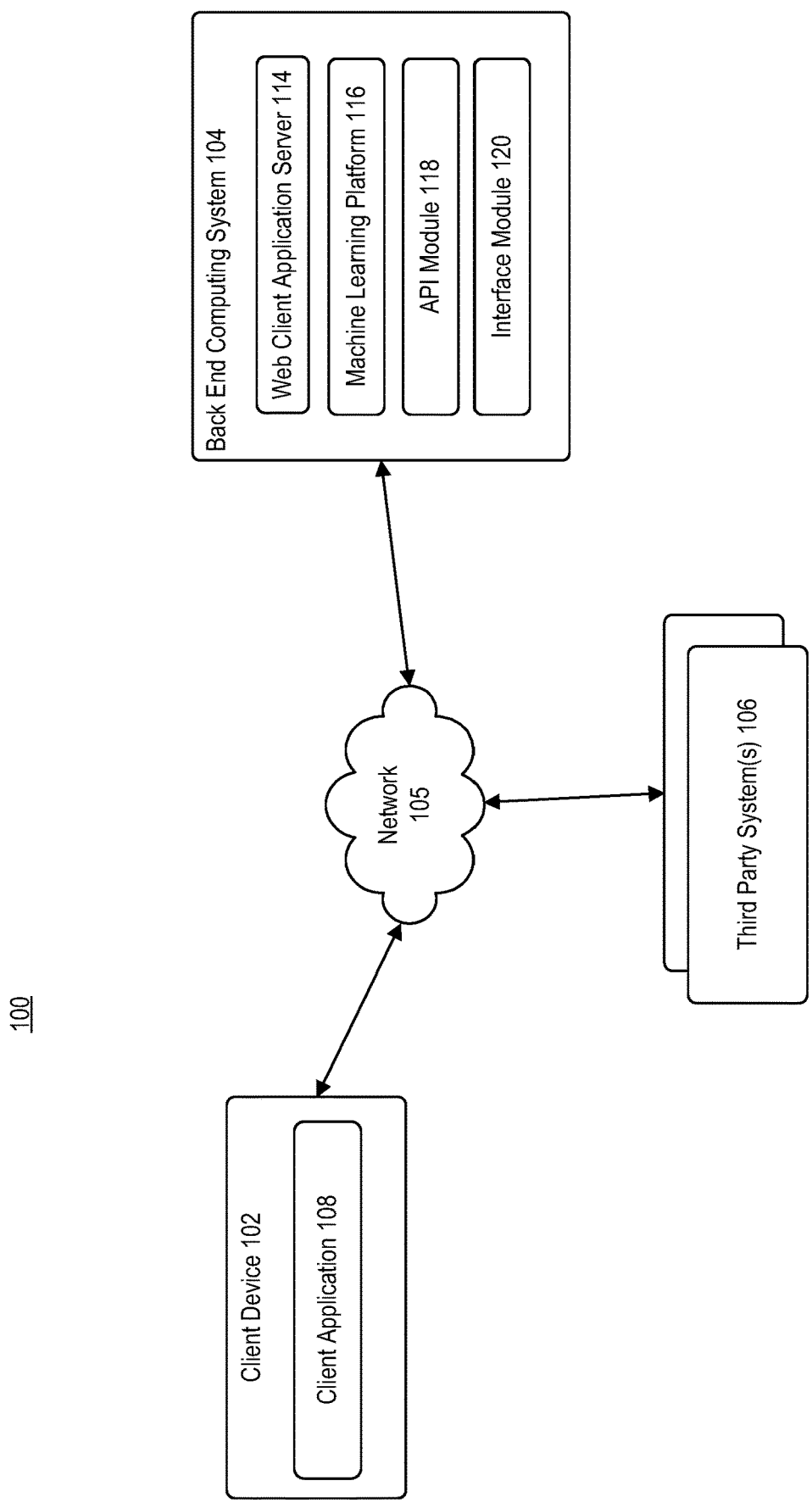
FIG. 1 is a block diagram illustrating a computing environment, according to example embodiments.

One or more techniques described herein are generally directed to a system and method for forecasting cash flow for a customer using one or more artificial intelligence processes. In some embodiments, the system may include a machine learning platform trained to forecast future customer activity based on historical customer activity. Such functionality aims to assist clients to forecast their cash balances by considering net inflow and outflow activity.

Inflow activity may be broadly defined as money entering a user's account or accounts. Example inflow activity may include a cash deposit, accrued interest, and the like. Outflow activity may be broadly defined as money leaving a user's account. Example outflow activity may include debits from a user's account. Together, inflow activity and outflow activity may be used to generate a user's current account balance. For example, a user's account balance at the end of a given day may be defined as the user's starting balance plus a sum of the daily changes (e.g., inflow activity and outflow activity).

Currently, conventional systems for forecasting a user's account balance suffer from one or more limitations. The error in forecast gets compounded when individual forecasts for inflow and outflow are combined to generate a cash balance. Over time, the error may get accumulated, resulting in a less accurate prediction. For example, due to the fluid nature of customer inflow and outflow data, over time, the various machine learning processes (or other forecasting methods) implemented by conventional systems become less accurate. Over time, the accumulation of less accurate forecasts may result in a prediction "drift." A drift may be present when forecast errors occur on a daily basis due to the volatile nature of customer inflow and outflow data, or the presence of a small bias in the forecast. As these small, daily, forecast errors accumulate, the forecasted balance tends to drift increasingly farther away from the actual balance. In other words, over time, the prediction models implemented by conventional systems become less accurate. Conventional systems currently have no methodology to account for such drift problems. This drift may be eliminated, of course, by forecasting balance directly, instead of forecasting separate inflow and separate outflow. The downside to such elimination, however, is that separate inflow forecasts and outflow forecasts are more useful to an end user than the balance forecast, by itself.

The one or more techniques described herein overcomes the drift problem plaguing conventional systems by combining one or more machine learning models trained to forecast inflow data and outflow data separately into a single model, thus limiting the error in the balance forecast. However, even accurate inflow and outflow forecasts may result in a poor or inaccurate balance forecast. In order to account for this possibility, the one or more techniques described herein also accounts for the difference between the forecasted inflow and outflow data. The difference between the forecasted inflow and outflow data may correspond to a change in account balance.

FIG. 1 is a block diagram illustrating a computing environment 100, according to example embodiments. Computing environment 100 may include one or more client devices 102 (generally, client device 102), back-end computing system 104, and one or more third-party systems 106 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Client device 102 may be in communication with back-end computing system 104 via network 105. Client device 102 may be operated by a user. For example, client device 102 may be a mobile device, a tablet, a desktop computer, a set-top box, a streaming player, or any computing system capable of receiving, rendering, and presenting video data to the user. Users may include, but are not limited to, individuals such as, for example, subscribers, clients, prospective clients, or customers of an entity associated with back-end computing system 104, such as individuals who have obtained, will obtain, or may obtain a product, service, or consultation from an entity associated with back-end computing system 104.

Client device 102 may include at least application 108. Application 108 may be representative of a web browser that allows access to a website or a stand-alone application. Client device 102 may access application 108 to access one or more functionalities of back-end computing system 104. Client device 102 may communicate over network 105 to request a webpage, for example, from web client application server 114 of back-end computing system 104. For example, client device 102 may be configured to execute application 108 to access forecasts and/or reports regarding a user's account, as generated by back-end computing system 104. The content that is displayed to client device 102 may be transmitted from web client application server 114 to client device 102, and subsequently processed by application 108 for display via a graphical user interface (GUI).

Back-end computing system 104 may include web client application server 114, machine learning platform 116, application programming interface (API) module 118, and interface module 120. Each of machine learning platform 116, API module 118, and interface module 120 may be comprised of one or more software modules. The one or more software modules may be collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Machine learning platform 116 may be configured to generate forecasts for a user account using one or more machine learning techniques. The details of machine learning platform 116 may be found below in conjunction with FIG. 2.

API module 118 may be configured to allow for communication between back-end computing system 104 and one or more third-party systems 106. For example, API module 118 may include a set of APIs, each API dedicated to a specific third-party system. Each API may be configured to facilitate communication between back-end computing system 104 and a respective third-party system 106 in accordance with various formats as defined by each respective third-party system 106. Via API module 118, back-end computing system 104 may dynamically receive or retrieve daily financial data (e.g., cash balance, inflow data, outflow data, etc.) from one or more third-party systems 106 for use with machine learning platform 116.

Interface module 120 may be configured to generate one or more graphical user interfaces for display via client device 102. For example, following an inflow, outflow, and cash balance forecast, interface module 120 may generate a GUI that includes the various forecast data. In some embodiments, interface module 120 may transmit the GUIs to client device 102 for rendering and display thereon. In some embodiments, interface module 120 may render GUI at back-end computing system 104. In such embodiments, interface module 120 may transmit the rendered GUI to client device 102 for display thereon.

Third-party systems 106 may be representative of various financial institutions, customer enterprise resource planning services, treasury management systems, customer relationship management services associated with one or more accounts of a user of client device 102, third-party account aggregators, and/or financial messaging services. Exemplary third-party systems may include, but are not limited to, SAP, NetSuite, SAGE, Intuit QuickBooks, Microsoft Dynamics, Kyriba, Plaid, Yodlee, SWIFT, Citi Bank, Wells Fargo, USAA, and the like.

Figure 2:
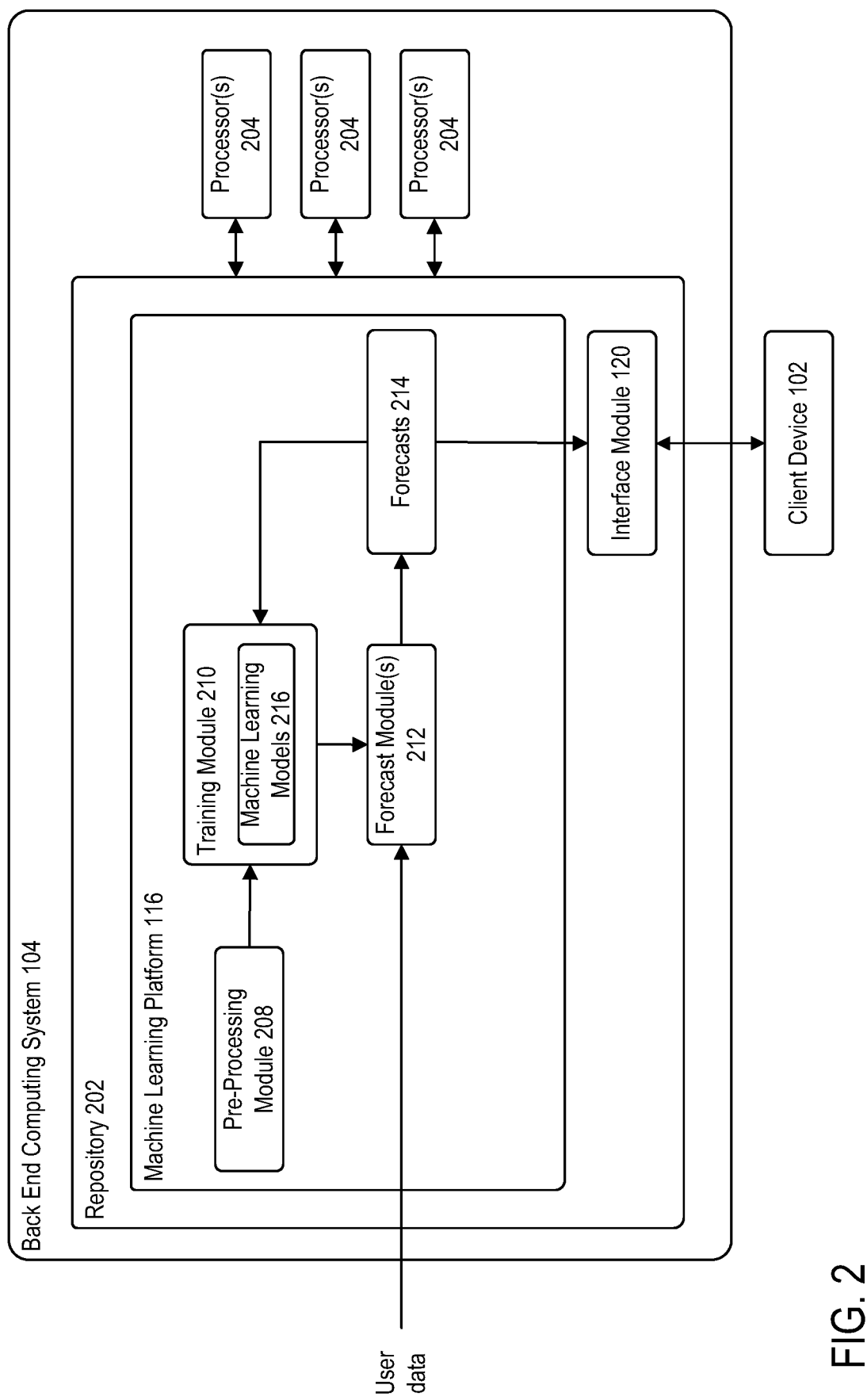
FIG. 2 is a block diagram illustrating back-end computing system of the computing environment of FIG. 1, according to one or more embodiments disclosed herein.

FIG. 2 is a block diagram illustrating back-end computing system 104, according to one or more embodiments disclosed herein. As shown in the illustrated example, back-end computing system 104 includes a repository 202 and one or more computer processors 204.

Repository 202 may be representative of any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. As shown, repository 202 includes at least machine learning platform 116.

Machine learning platform 116 may be configured to forecast various metrics associated with a user's account. For example, machine learning platform 116 may be configured to forecast future inflow data and future outflow data for a user's account using one or more machine learning processes. As shown, machine learning platform 116 includes pre-processing module 208, training module 210, and forecast modules 212. Each of pre-processing module 208 and training module 210 may be comprised of one or more software modules. The one or more software modules are collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Pre-processing module 208 may be configured to gather data for training module 210. In some embodiments, pre-processing module 208 is configured to communicate with one or more third-party systems 106 and/or internal databases to retrieve data relevant for training. Exemplary training data may include historical cash position information (e.g., daily or intraday user account data), historical accounts receivable data, historical accounts payable data, historical order book data, and the like.

In some embodiments, pre-processing module 208 may further capture additional exogenous inputs for training. Exemplary exogenous inputs may include calendar data, such as current weekday number and whether the following day is a holiday. In some embodiments, inputs may be scaled between, for example, 0 and 1.

In some embodiments, pre-processing module 208 may further capture various types of transactions as inputs for training. Exemplary transaction type inputs may include, but are not limited to, rent payments, loan payments, one-time loan funds, and the like. These transactions may be further classified as usual and/or unusual payments.

In some embodiments, pre-processing module 208 may capture user expectation data for training. Exemplary expectation inputs may include, but are not limited to, future cash receivables (e.g., future accounts receivables) and future cash payables (e.g., future accounts payables).

Training module 210 may be configured to train machine learning model 216 to generate a personalized future inflow data forecasts and future outflow data forecasts based at least on various information associated with the user. In some embodiments, training module 210 may further train machine learning model 216 to generate a balance forecast based on the inflow forecast, the outflow forecast, and the known end-of-day balance from the prior day. In some embodiments, the training process may be a supervised training process. For example, the training set of historical inflow and outflow data may also include the corresponding known forecast information. During the training process, parameters of the machine learning model 216 may be adjusted in order to optimize (e.g., minimize) the value of an objective function (e.g., loss functions). In some embodiments, the parameters may be changed automatically by training module 210. In some embodiments, the parameters may be changed manually by an operator or developer.

The objective function of machine learning model 216 may be used to penalize errors not only for inflow and outflow forecasts, but also for their difference, which may correspond to a change in balance. By penalizing errors in the balance forecast, training module 210 may reduce the drift of the forecasted value from the actual balance.

In some embodiments, the objective function may be composed of a sum of various components: an inflow component, an outflow component, and a difference component (i.e., a change in balance). In some embodiments, the objective function may further include a weight parameter. The weight parameter may provide for a tradeoff between inflow/outflow prediction errors and the balance prediction errors. In other words, by adjusting the weight parameter, the objective function may be optimized for improving the balance forecast accuracy at the expense of a slightly less accurate inflow/outflow forecast.

In some embodiments, training module 210 may train machine learning model 216 to generate a single day's forecast. In some embodiments, training module 210 may train machine learning model 216 to forecast a longer horizon, i.e., more than a single day's forecast. For example, training module 210 may utilize forecasted values, as well as historical inflow and outflow data, to train machine learning model 216 to generate forecasts beyond a single day.

In some embodiments, training module 210 may train machine learning model 216 on a data set dedicated to the target user. For example, training module 210 may train a user specific machine learning model 216 based on historical inflow and outflow data corresponding to the particular individual or entity. In some embodiments, training module 210 may train machine learning model 216 across various users and/or accounts. Such training process may be useful when entities or users exhibit similar activity patterns. As such, training module 210 may train machine learning model 216 on user specific data, as well as user data associated with other users that have similar characteristics, demographics, and/or financials to the target user.

In some embodiments, machine learning model 216 may be representative of a recurrent neural network. A recurrent neural network may be composed of a sequence of identical cells. Each cell may receive, as input, new daily information (e.g., inflow activity, outflow activity, previous end-of-day balance) and hidden states from previous cells. Based on the new daily information and hidden states from previous cells, the recurrent neural network may calculate a weighted sum and propagate forward to the next day. As output, recurrent neural network may generate a forecast.

For a recurrent neural network, a combination of forward propagation and back propagation may be used for training. During forward propagation, recurrent neural network may receive a sequence of data, calculate a forecast, compare the forecast to actual data, and then calculate the error between the forecasted value and the actual value. During back propagation, one or more weights of the recurrent neural network may be updated to reduce or minimize the error calculated during forward propagation.

In some embodiments, recurrent neural network may include multiple layers, in which the daily input and previous day's hidden cells may be used to compute outputs. The outputs may then be fed into another layer with its own hidden cells. This process may be repeated until a final output is generated that may be used for the forecast.

In some embodiments, machine learning model 216 may be representative of a long short-term memory (LSTM). A LSTM model is a specific artificial recurrent neural network architecture capable of learning long term dependencies. LSTM model may learn to capture multiple periodic patterns in a user's or client's data, such as weekly, semi-weekly, monthly, and the like. In some embodiments, using an LSTM model may allow machine learning platform 116 to model inflow, outflow, and balance together in a combined model.

Although recurrent neural network models and LSTM models are discussed as being two exemplary types of models for use in machine learning platform 116, those skilled in the art understand that machine learning model 216 may not be limited to such models. Instead, additional machine learning models may be used. Exemplary machine learning models or algorithms may include, but are not limited to, random forest model, support vector machines, neural networks, deep learning models, Bayesian algorithms, Temporal Convolutional Networks, and the like.

Following training, training module 210 may generate one or more forecast modules 212. In some embodiments, one or more forecast modules 212 may be used across a user base. For example, a given forecast module 212 may be trained or optimized for more than one user. In some embodiments, one or more forecast modules 212 may be representative of a plurality of uniquely trained forecast modules, with each forecast module corresponding to a dedicated user. In operation, one or more forecast modules 212 may be deployed to generate one or more forecasts 214 that include various metrics associated with the user's account. For example, forecasts 214 may be representative of a future inflow forecast, a future outflow forecast, and a future balance forecast. As shown and described above, forecasts 214 may be fed back into training module 210 for continuous or future learning.

Although trained by training module 210, machine learning platform 116 may support a self-training process. For example, the process flow may be a closed looped process, in which training module 210 may continuously or periodically update one or more forecast modules 212 by retraining machine learning model 216, generating new weights, and creating updated forecast based on the new weights. In some embodiments, retraining machine learning model 216 may include evaluating model performance over time using an accuracy or error metric. In some embodiments, machine learning platform 116 may be retrained on a periodic basis. In some embodiments, this evaluation process may be automatic. In some embodiments, machine learning model 216 may be retrained on an ongoing basis.

Once trained, one or more forecast modules 212 may be deployed within machine learning platform 116. Forecast module 212 may receive, as input, various data related to the user's account. In some embodiments, forecast module 212 may receive daily or intraday data related to the user's accounts. Exemplary daily or intraday data may include information related to the user's financial accounts, such as, but not limited to, checking accounts, savings accounts, and the like. In some embodiments, forecast module 212 may receive the daily or intraday data via API module 118. For example, API module 118 may leverage one or more APIs associated with the user's financial institutions for pulling or receiving account data on a daily or intraday basis. Such information may provide forecast module 212 with the user's cash positions during the day and/or at the end of the day.

In some embodiments, forecast module 212 may receive, as input, enterprise resource planning (ERP) data. For example, forecast module 212 may receive various data from one or more customer ERP systems. Exemplary ERP data may include, but is not limited to accounts receivable data, accounts payable data, and/or client order book information. In some embodiments, forecast module 212 may receive the ERP data via API module 118. For example, API module 118 may leverage one or more APIs associated with the user's ERP systems for pulling or receiving account data on a real-time or near real-time basis.

In some embodiments, forecast module 212 may receive, as input, historical data associated with the user. In some embodiments, the historical data associated with the user may be in the form of a Bank Administration Institute (BAI) file. In some embodiments, forecast module 212 may receive the user's historical data via API module 118. For example, API module 118 may leverage one or more APIs associated with the user's financial intuitions for pulling or receiving the user's historical data. Because of the nature of historical data, API module 118 may only need to request this information once.

Based on the daily/intraday account data, the ERP data, and the historical data, forecast module 212 may project or forecast future cash flow for the user. In some embodiments, forecast module 212 may project or forecast future inflow. In some embodiments, forecast module 212 may project or forecast future outflow. In some embodiments, forecast module 212 may project or forecast future balance data (e.g., based on forecasted future inflow and forecasted future outflow). In this manner, forecast module 212 may provide a user with actionable insights related to their financial health.

Interface module 120 may be generate a graphical representation of the forecasted data for display via client device 102. For example, following an inflow, outflow, and cash balance forecast, interface module 120 may generate a GUI that includes the various forecast data. In some embodiments, interface module 120 may transmit the GUIs to client device 102 for rendering and display thereon. In some embodiments, interface module 120 may render GUI at back-end computing system 104. In such embodiments, interface module 120 may transmit the rendered GUI to client device 102 for display thereon.

Although FIG. 2 is discussed in conjunction with machine learning platform 116 and forecast module 212 being remote from client device 102, it should be understood that training and/or deployment of machine learning platform 116 may be performed local to client device 102. For example, the foregoing techniques may be used in a browser (e.g., application 108) using machine learning libraries such as, for example, tensorflow.js, or using a graphics processing unit (GPU) of client device 102 using graphics libraries such as, for example, WebGL. Following training, machine learning platform 116 may be deployed within the browser.

In some embodiments, depending on the complexity of machine learning platform 116 implementation, forecast module 212 may be trained on back-end computing system 104 and deployed locally via application 108. For example, the foregoing techniques may utilize a knowledge distillation process, in which a larger, complex model is trained using the above techniques and the knowledge used from training the larger, complex model is distilled to a smaller, lightweight model that is capable of being deployed locally via application 108 on client device 102.

Figure 3:
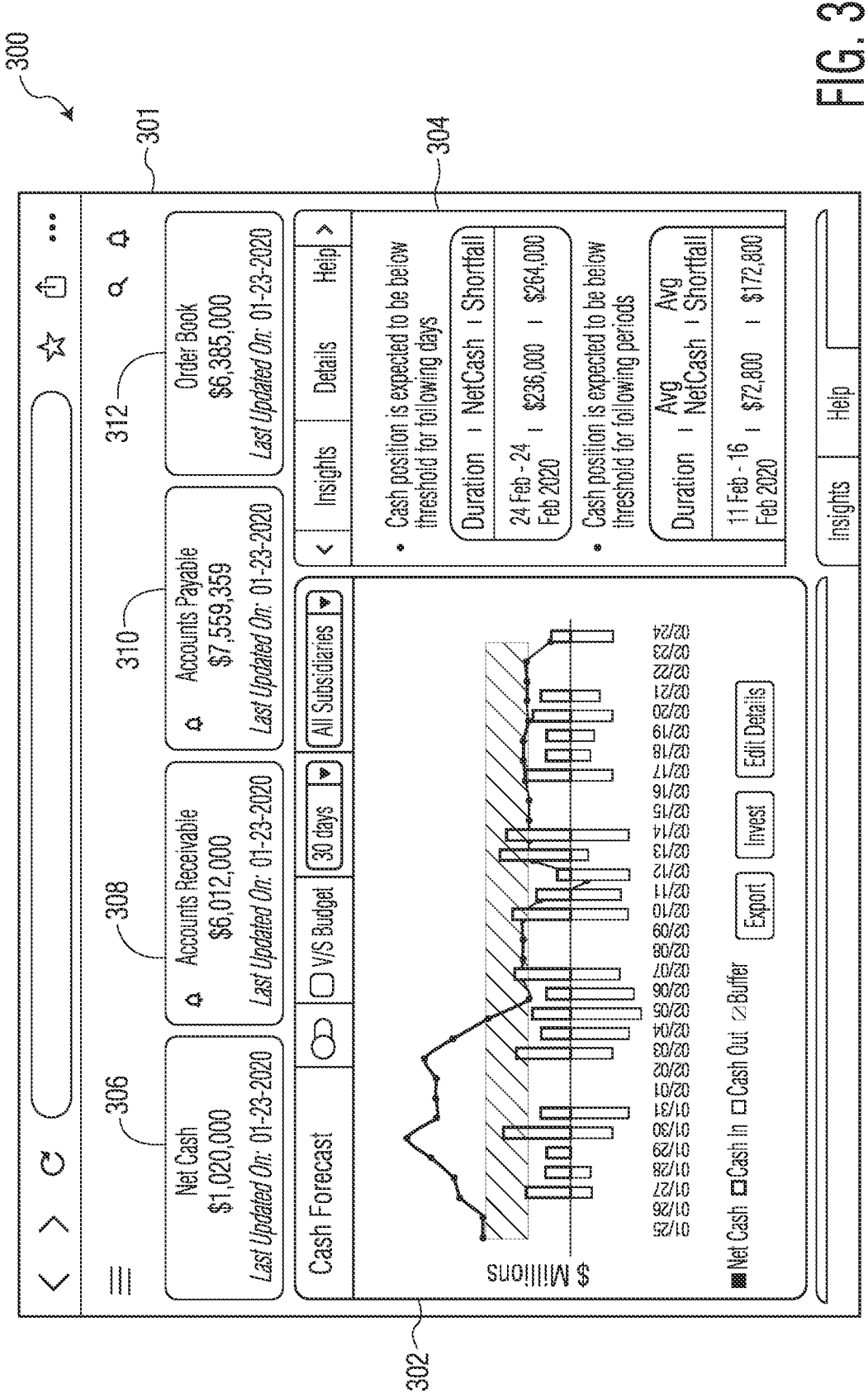
FIG. 3 illustrates an exemplary graphical user interface (GUI) generated by interface module, according to example embodiments.

FIG. 3 illustrates an exemplary graphical user interface (GUI) 300 generated by interface module 120, according to example embodiments. Graphical user interface (hereinafter "GUI 300") may correspond to a GUI generated by interface module 120. In some embodiments, GUI 300 may be a web page presented in a web browser application (e.g., application 108) of client device 102. In some embodiments, GUI 300 may be a graphical user interface generated by a native software application (e.g., application 108) executing on client device 102.

GUI 300 may include a dashboard 301. Dashboard 301 may provide users with a snapshot of their cashflow, as well as a cash forecast and generated insights. Dashboard 301 may include a cash forecast 302 and insights 304. Cash forecast 302 may be generated by forecast module 212. Cash forecast 302 may include an inflow data forecast, an outflow data forecast, and a balance forecast. As shown, cash forecast 302 may span a time frame as defined by the user. In the present example, cash forecast 302 may represent a 30-day cash forecast.

Insights 304 may correspond to various insights generated by forecast module 212. Forecast module 212 may generate insights 304 based on the generated cash forecast. In some embodiments, insights 304 may take the form of notifications or alerts. For example, as shown, insights 304 may include information related to the user's cash position during defined periods of time.

In some embodiments, dashboard 301 may further include a snapshot of the user's current cash position. For example, as shown, dashboard 301 may include a net cash element 306, an accounts receivable element 308, an accounts payable element 310, and an order book element 312. Net cash element 306 may represent the user's current net cash position, e.g., balance. In some embodiments, the user's current net cash position may be generated based on daily or intraday information from the user's financial accounts. Accounts receivable element 308 may represent the user's current account receivables. Accounts payable element 310 may represent the user's current account payable information. Order book element 312 may represent the user's current order book information. In some embodiments, each of the user's current account receivables, current account payables, and order book information may be generated in real-time or near-real time based on data received or retrieved from one or more third-party systems 106.

Figure 4:
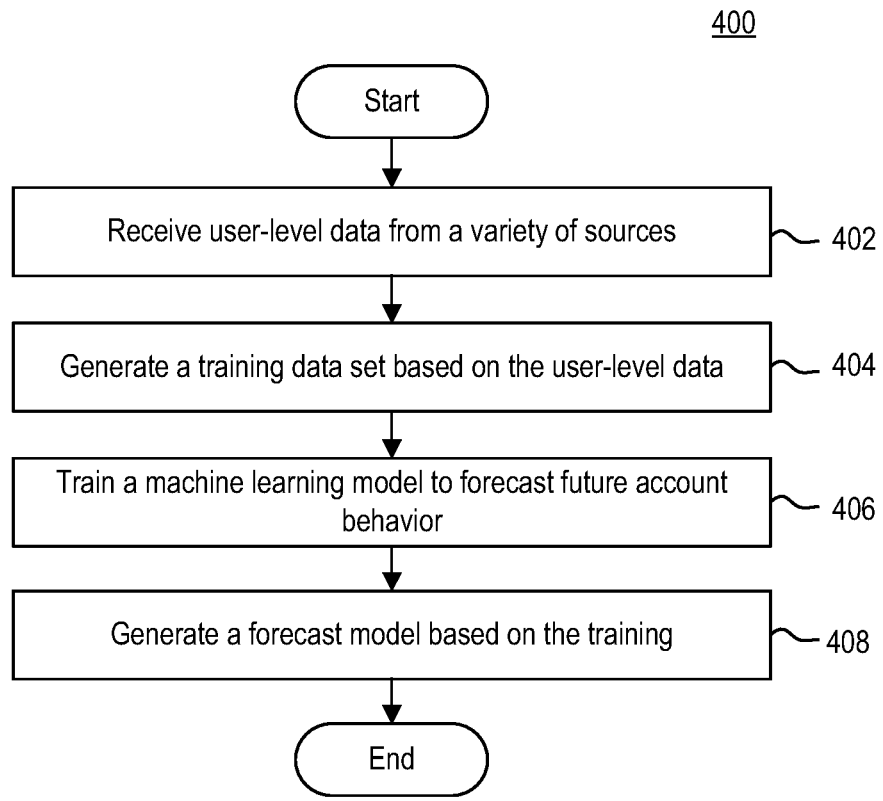
FIG. 4 is a flow diagram illustrating a method of generating a forecast module, according to example embodiments.

FIG. 4 is a flow diagram illustrating a method 400 of generating a forecast module, according to example embodiments. As shown, method 400 may begin at step 402.

At step 402, back-end computing system 104 may receive (or retrieve) user-level data from a variety of data sources. For example, machine learning platform 116 may communicate with one or more third-party systems 106 and/or internal databases to access user-level data. Exemplary user-level data may include historical cash position information (e.g., daily or intraday user account data), historical accounts receivable data, historical accounts payable data, historical order book data, and the like. In some embodiments, machine learning platform 116 may communicate with one or more third-party systems 106 via API module 118. For example, API module 118 may access user-level data from one or more third-party systems 106 via one or more APIs linking one or more third-party system 106 to back-end computing system 104. In some embodiments, each API may be dedicated to a specific third-party system 106.

In some embodiments, back-end computing system 104 may retrieve user-level data for a single user. In some embodiments, back-end computing system 104 may retrieve user-level data for a plurality of users.

At step 404, back-end computing system 104 may generate training data based on the user-level data. For example, pre-processing module 208 may format or convert the user-level data into a format compatible with training module 210 and/or machine learning model 216. In some embodiments, formatting the user-level data may include anonymizing the user-level data to protect any sensitive information that may be contained in the user-level data.

In some embodiments, generating the training data set may include pre-processing module 208 deriving additional data from the user-level information. For example, pre-processing module 208 derive a transaction type for various transactions included in the user-level data. Exemplary transaction type inputs may include, but are not limited to, rent payments, loan payments, one-time loan funds, and the like. These transactions may be further classified as usual and/or unusual payments.

In some embodiments, generating the training data set may include pre-processing module 208 augmenting the user-level data with context related to the user-level data. For example, based on the user-level data, pre-processing module 208 may derive exogenous inputs, such as, but not limited to, calendar data, such as current weekday number and whether the following day is a holiday, for each input data element.

In some embodiments, generating the training data set may include providing corresponding forecasts to the user-level data. For example, if training module 210 is implementing a supervised training process, the training data set may include historical inflow information, historical outflow information, historical balance information, and may also include a corresponding known forecast information based on snapshots of the historical data.

In some embodiments, generating the training data set may include pre-processing module 208 clustering the user base. For example, rather than training module 210 train machine learning model 216 on user-specific data, training module 210 may train machine learning model 216 on user-specific data and other user data, where the other user data corresponds to users that are demographically similar to the target user. Using a specific example, if the target user is a female engineer, in California, with two children, training module 210 may identify user-level data for other female engineers living in California with two children. Using another example, if the target user is an organization or company, training module 210 may identify organization-level data for organizations that have similar characteristics as the target organization (e.g., FinTech organization, semiconductor manufacturing organization, organizations with less than 100 employees in Oregon, restaurants of a certain size in a certain location, etc.). Using a broader example, training module 210 may identify user-level data for other engineers living in California.

At step 406, back-end computing system 104 may train machine learning model 216 to forecast future account behavior based on the training data set. For example, training module 210 may train machine learning model 216 to generate a personalized future inflow data forecasts, future outflow data forecasts, and future balance forecasts based on the training data set. In some embodiments, training module 210 may further train machine learning model 216 to generate a balance forecast based on the inflow forecast, the outflow forecast, and the known end-of-day balance from the prior day. In some embodiments, the training process may be a supervised training process. During the training process, parameters of the machine learning model 216 may be adjusted in order to optimize (e.g., minimize) the value of an objective function (e.g., loss functions). In some embodiments, the parameters may be changed automatically by training module 210. In some embodiments, the parameters may be changed manually by an operator or developer.

In some embodiments, machine learning model 216 may be optimized for a single user. In such embodiments, the training may be performed for each user in the user base. In some embodiments, machine learning models 216 may be optimized for a group of users that includes a target user.

At step 408, back-end computing system 104 may generate a forecast module based on the training. For example, once training module 210 trains machine learning model 216 to an acceptable convergence (as specified by an operator), back-end computing system 104 may deploy forecast module 212 within machine learning platform 116. Once deployed, forecast module 212 may be configured to forecast future inflow data, future outflow data, and future balance data.

Figure 5:
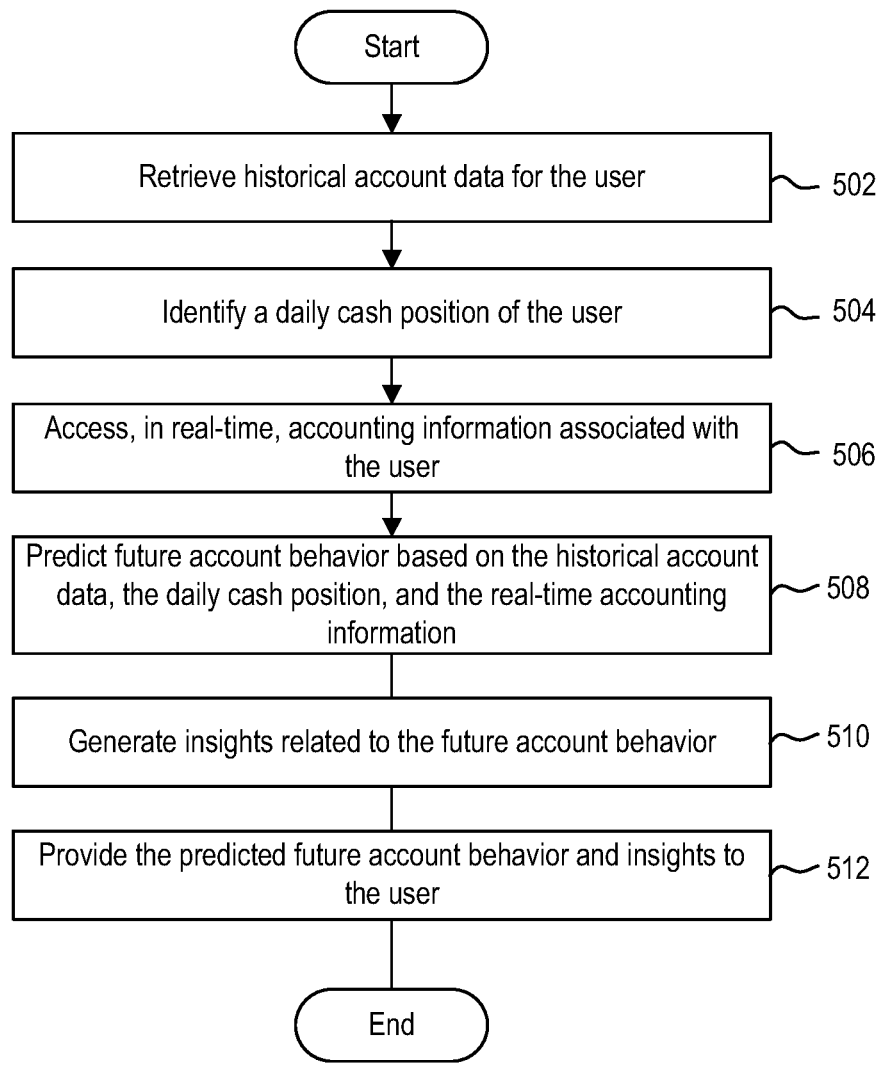
FIG. 5 is a flow diagram illustrating a method of generating user forecasts, according to example embodiments.

FIG. 5 is a flow diagram illustrating a method 500 of generating user forecasts, according to example embodiments. Method 500 may begin at step 502.

At step 502, back-end computing system 104 may retrieve historical account data for a target user. In some embodiments, the historical data associated with the user may be in the form of a BAI (Bank Administration Institute) file. In some embodiments, forecast module 212 may receive the user's historical data via API module 118. For example, API module 118 may leverage one or more APIs associated with the user's financial intuitions for pulling or receiving the user's historical data.

At step 504, back-end computing system 104 may identify a daily cash position of the user. For example, forecast module 212 may receive daily or intraday data related to the user's accounts. Exemplary daily or intraday data may include information related to the user's financial accounts, such as, but not limited to, checking accounts, savings accounts, and the like. In some embodiments, forecast module 212 may receive the daily or intraday data via API module 118. For example, API module 118 may leverage one or more APIs associated with the user's financial institutions for pulling or receiving account data on a daily or intraday basis. Such information may provide forecast module 212 with the user's cash positions during the day and/or at the end of the day.

At step 506, back-end computing system 104 may access, in real-time or near real-time, accounting information associated with the user. For example, forecast module 212 may receive various data from one or more customer ERP systems. Exemplary ERP data may include, but is not limited to accounts receivable data, accounts payable data, and/or client order book information. In some embodiments, forecast module 212 may receive the ERP data via API module 118. For example, API module 118 may leverage one or more APIs associated with the user's ERP systems for pulling or receiving account data on a real-time or near real-time basis.

At step 508, back-end computing system 104 may predict or forecast future account behavior based on one or more of the historical account data, the daily cash position, and the accounting data. In some embodiments, forecast module 212 may forecast a future inflow data and a future outflow data based on one or more of the historical account data, the daily cash position, and the accounting data. In some embodiments, forecast module 212 may further construe a forecast account balance based on the forecasted future inflow, the forecasted future outflow, and the current balance information.

At step 510, back-end computing system 104 may generate insights related to the future account behavior. For example, based on the forecasted future inflow information, the forecasted future outflow information, and/or the forecasted account balance, forecast module 212 may generate alerts or insights related to the user's cash position.

At step 512, back-end computing system 104 may provide the predicted future account behavior and generated insights to the user. For example, interface module 120 may generate an interactive user interface that allows a user to view the forecasts and insights (e.g., recommendations) via application 108.

Figure 6A:
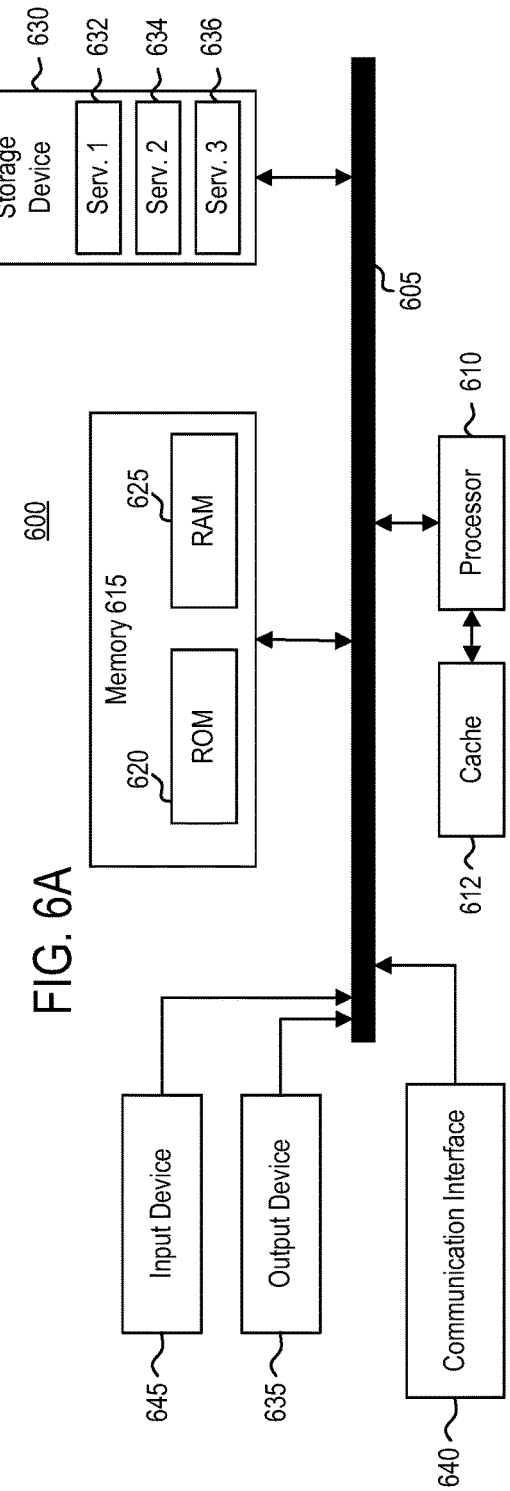
FIG. 6A is a block diagram illustrating a computing device, according to example embodiments.

FIG. 6A illustrates an architecture of computing system 600, according to example embodiments. System 600 may be representative of at least a portion of back-end computing system 104. One or more components of system 600 may be in electrical communication with each other using a bus 605. System 600 may include a processing unit (CPU or processor) 610 and a system bus 605 that couples various system components including the system memory 615, such as read only memory (ROM) 620 and random access memory (RAM) 625, to processor 610. System 600 may include a cache of high-speed memory connected directly with, in close proximity to, or integrated as part of processor 610. System 600 may copy data from memory 615 and/or storage device 630 to cache 612 for quick access by processor 610. In this way, cache 612 may provide a performance boost that avoids processor 610 delays while waiting for data. These and other modules may control or be configured to control processor 610 to perform various actions. Other system memory 615 may be available for use as well. Memory 615 may include multiple different types of memory with different performance characteristics. Processor 610 may include a processor and a hardware module or software module, such as service 1 632, service 2 634, and service 3 636 stored in storage device 630, configured to control processor 610, as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system 600, an input device 645 may represent any number of input mechanisms, such as a microphone for speech, a touch-sensitive screen for gesture or graphical input, keyboard, mouse, motion input, speech and so forth. An output device 635 (e.g., display) may also be one or more of a number of output mechanisms. In some instances, multimodal systems may enable a user to provide multiple types of input to communicate with computing system 600. Communications interface 640 may generally govern and manage the user input and system output. There is no restriction on operating on any particular hardware arrangement and therefore the basic features here may be substituted for improved hardware or firmware arrangements as they are developed.

Storage device 630 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 may include services 632, 634, and 636 for controlling the processor 610. Other hardware or software modules are contemplated. Storage device 630 may be connected to system bus 605. In one aspect, a hardware module that performs a particular function may include the software component stored in a computer-readable medium in connection with the necessary hardware components, such as processor 610, bus 605, output device 635, and so forth, to carry out the function.

Figure 6B:
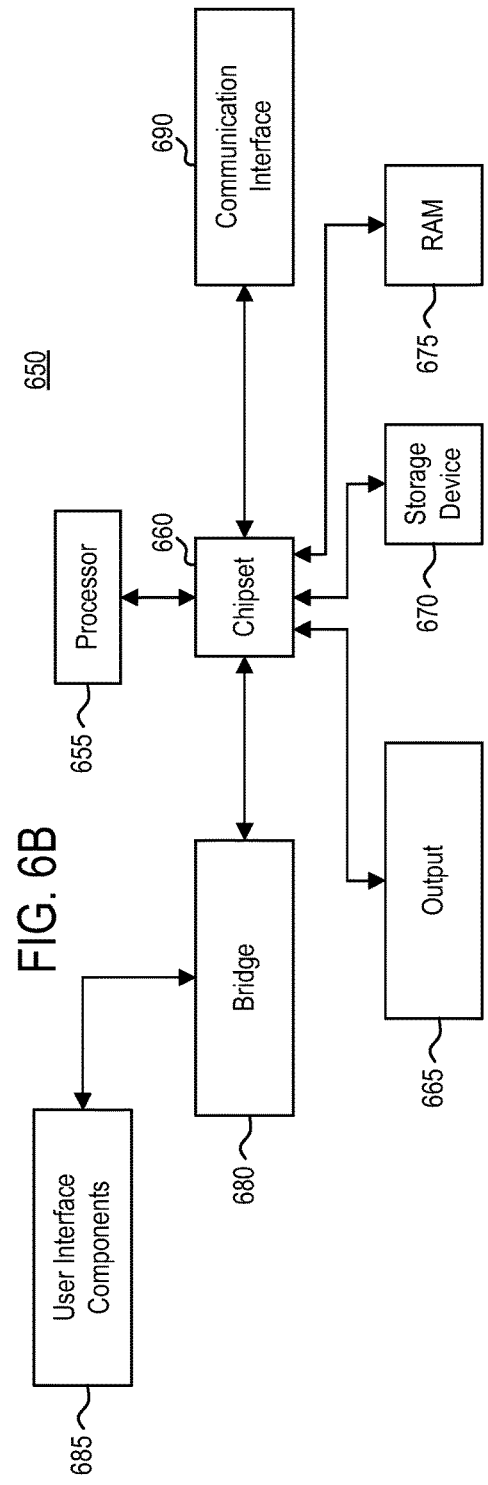
FIG. 6B is a block diagram illustrating a computing device, according to example embodiments.

FIG. 6B illustrates a computer system 650 having a chipset architecture that may represent at least a portion of back-end computing system 104. Computer system 650 may be an example of computer hardware, software, and firmware that may be used to implement the disclosed technology. System 650 may include a processor 655, representative of any number of physically and/or logically distinct resources capable of executing software, firmware, and hardware configured to perform identified computations. Processor 655 may communicate with a chipset 660 that may control input to and output from processor 655. In this example, chipset 660 outputs information to output 665, such as a display, and may read and write information to storage device 670, which may include magnetic media, and solid-state media, for example. Chipset 660 may also read data from and write data to RAM 675. A bridge 680 for interfacing with a variety of user interface components 685 may be provided for interfacing with chipset 660. Such user interface components 685 may include a keyboard, a microphone, touch detection and processing circuitry, a pointing device, such as a mouse, and so on. In general, inputs to system 650 may come from any of a variety of sources, machine generated and/or human generated.

Chipset 660 may also interface with one or more communication interfaces 690 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 655 analyzing data stored in storage device 670 or RAM 675. Further, the machine may receive inputs from a user through user interface components 685 and execute appropriate functions, such as browsing functions by interpreting these inputs using processor 655.

It may be appreciated that example systems 600 and 650 may have more than one processor 610 or be part of a group or cluster of computing devices networked together to provide greater processing capability.

Some portions of the present disclosure describe embodiments in terms of algorithms and/or routines and symbolic representations of operations on information. These algorithmic descriptions and representations are used to convey the substance of this disclosure effectively to others skilled in the art. These operations, while described functionally, computationally, or logically, are to be understood as being implemented by data structures, computer programs or equivalent electrical circuits, microcode, or the like. Furthermore, at times, it may be convenient to refer to these arrangements of operations as routines or algorithms. The described operations and their routines/algorithms may be embodied in specialized software, firmware, specially-configured hardware or any combinations thereof.

The methods described herein (that may be conducted by the learning system of the present disclosure) may be performed by processing logic that may comprise hardware (e.g., circuitry, dedicated logic, programmable logic, microcode, etc.), software (such as instructions run on a processing device), or a combination thereof. In one embodiment, the methods described herein may be performed by one or more specialized processing components described herein.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. Connections between computers may be wired in some cases (e.g., via wired TCP connection or other wired connection) or may be wireless (e.g., via a WIFI network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic information/transaction system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system comprising:
one or more processors; and
a memory having programming instructions stored thereon, which, when executed by the one or more processors, performs operations, comprising:
retrieving historical account activity for a plurality of users, the historical account activity comprising historical inflow data and historical outflow data;
constructing a training data set comprising the historical inflow data, the historical outflow data, and known forecast information from the historical account activity;
generating a prediction model configured to forecast future inflow activity and future outflow activity, the generating comprising:
learning, by the prediction model, to forecast the future inflow activity and the future outflow activity based on the training data set, the learning comprising optimizing an objective function of the prediction model by penalizing errors for projected inflow predictions, projected outflow predictions, and differences between the projected inflow predictions and projected outflow predictions to reduce a drift in forecasted values, the objective function comprising at least one weight parameter that, if adjusted in favor of a predicted account balance, increases an accuracy of the predicted account balance and decreases an accuracy of the projected inflow predictions and the projected outflow predictions;
receiving, from one or more third-party systems, current inflow activity, current outflow activity, and current balance information for a user;
generating the predicted account balance by:
forecasting, by the prediction model, a future inflow and a future outflow; and
constructing the predicted account balance based on the future inflow, the future outflow, and the current balance information;
retraining the prediction model, said retraining comprising:
evaluating a performance of the prediction model based on an accuracy of one or more of the future inflow, the future outflow and the predicted account balance,
adjusting the at least one weight parameter based on said evaluating, and
optimizing the objective function based on the adjusted at least one weight parameter.

2. The system of claim 1, wherein the objective function comprises:
an inflow component associated with the projected inflow predictions;
an outflow component associated with the projected outflow predictions; and
a difference component associated with the differences between the projected inflow predictions and the projected outflow predictions.

3. The system of claim 2, wherein the weight parameter provides a tradeoff between the projected inflow predictions, the projected outflow predictions, and the difference component.

4. The system of claim 1, wherein adjusting the at least one weight parameter in favor of the projected inflow predictions and the projected outflow predictions increases an accuracy of the projected inflow predictions and the projected outflow predictions and decreases an accuracy of the predicted account balance.

5. The system of claim 1, wherein the operations further comprise:
generating a graphical user interface comprising a dashboard capturing account information associated with the user, the account information comprising the future inflow, the future outflow, and the predicted account balance.

6. The system of claim 1, wherein constructing the training data set comprises:
deriving transaction type information based on the historical account activity; and
augmenting the training data set with the transaction type information.

7. The system of claim 1, wherein the operations further comprise:
generating a plurality of insights based on at least one of the future inflow, the future outflow, and the predicted account balance.

8. The system of claim 1,
wherein retraining the prediction model occurs at least one of periodically and continuously, and wherein the evaluating occurs automatically.

9. A method comprising:
   retrieving, by a computing system, historical account activity for a plurality of users, the historical account activity comprising historical inflow data and historical outflow data, the computing system comprising one or more processors executing programming instructions stored in a memory;
   constructing, by the computing system, a training data set comprising the historical inflow data, the historical outflow data, and known forecast information from the historical account activity; and
   generating, by the computing system, a prediction model configured to forecast future inflow activity and future outflow activity, the generating comprising:
      learning, by the prediction model, to forecast the future inflow activity and the future outflow activity based on the training data set, the learning comprising optimizing an objective function of the prediction model by penalizing errors for projected inflow predictions, projected outflow predictions, and differences between the projected inflow predictions and projected outflow predictions to reduce a drift in forecasted values,
      the objective function comprising at least one weight parameter that, if adjusted in favor of the differences, increases an accuracy of the differences and decreases an accuracy of the projected inflow predictions and the projected outflow predictions;
      retraining, by the computing system, the prediction model, said retraining comprising:
         evaluating a performance of the prediction model based on an accuracy of one or more of a future inflow, a future outflow and a predicted account balance generated by the prediction model,
         adjusting the at least one weight parameter based on said evaluating, and
         optimizing the objective function based on the adjusted at least one weight parameter.

10. The method of claim 9, wherein the objective function comprises:
   an inflow component associated with the projected inflow predictions;
   an outflow component associated with the projected outflow predictions; and
   a difference component associated with the differences between the projected inflow predictions and the projected outflow predictions.

11. The method of claim 10, wherein the weight parameter provides a tradeoff between the projected inflow predictions, the projected outflow predictions, and the differences.

12. The method of claim 9, wherein adjusting the at least one weight parameter in favor of the projected inflow predictions and the projected outflow predictions increases an accuracy of the projected inflow predictions and the projected outflow predictions and decreases an accuracy of the differences.

13. The method of claim 9, wherein constructing the training data set comprises:
   deriving transaction type information based on the historical account activity; and
   augmenting the training data set with the transaction type information.

14. The method of claim 9, wherein constructing the training data set comprises:
   accessing a userbase comprising the plurality of users; and
   clustering the userbase into a plurality of clusters based on demographic information associated with the plurality of users or characteristic information associated with a plurality of organizations.

15. The method of claim 9,
   wherein retraining the prediction model occurs at least one of periodically and continuously, and wherein the evaluating occurs automatically.

16. The method of claim 9, wherein constructing the training data set comprises:
   augmenting the training data set with exogenous inputs comprising one or more of calendar data related to the historical inflow data, the historical outflow data and customer characteristic information.

17. A non-transitory computer readable medium comprising one or more sequences of instructions, which, when executed by one or more processors, causes a computing system to perform operations comprising:
   receiving, by the computing system, current inflow activity, current outflow activity, and current balance information for a user;
   generating, by the computing system, future forecasts for the user using a prediction model trained to forecast future inflow activity and forecast future outflow activity by:
      forecasting, by the prediction model, a future inflow and a future outflow based on the current inflow activity, current outflow activity, and the current balance information for the user;
      constructing, by the computing system, future balance data based on the future inflow and the future outflow; and
      presenting, by the computing system, the future inflow, the future outflow, and the future balance data to the user,
         wherein the prediction model is trained by optimizing an objective function that includes at least one weight parameter, and wherein adjusting the at least one weight parameter in favor of the future balance data increases an accuracy of the future balance data and decreases an accuracy of the future inflow and the future outflow; and
   retraining the prediction model, said retraining comprising:
      evaluating a performance of the prediction model based on an accuracy of one or more of the future inflow, the future outflow and the future balance data;
      adjusting the at least one weight parameter based on said evaluating and
      optimizing the objective function based on the adjusted at least one weight parameter.

18. The non-transitory computer readable medium of claim 17, further comprising:
   generating a graphical user interface comprising a dashboard capturing account information associated with the user, the account information comprising the future inflow, the future outflow, and the future balance data.

* * * * *